(12) United States Patent
Kimura

(10) Patent No.: US 12,252,626 B2
(45) Date of Patent: Mar. 18, 2025

(54) AQUEOUS COATING AGENT COMPOSITION

(71) Applicant: MOMENTIVE PERFORMANCE MATERIALS JAPAN LLC, Tokyo (JP)

(72) Inventor: Masanori Kimura, Tokyo (JP)

(73) Assignee: MOMENTIVE PERFORMANCE MATERIALS JAPAN LLC, Tokyo (JP)

(*) Notice: Subject to any disclaimer, the term of this patent is extended or adjusted under 35 U.S.C. 154(b) by 663 days.

(21) Appl. No.: 17/533,261

(22) Filed: Nov. 23, 2021

(65) Prior Publication Data

US 2022/0081589 A1 Mar. 17, 2022

Related U.S. Application Data

(63) Continuation of application No. PCT/JP2020/023991, filed on Jun. 18, 2020.

(30) Foreign Application Priority Data

Jun. 19, 2019 (JP) ................................ 2019-113411

(51) Int. Cl.

| | | |
|---|---|---|
| C09D 183/04 | (2006.01) | |
| B05D 7/02 | (2006.01) | |
| C08G 77/08 | (2006.01) | |
| C08G 77/12 | (2006.01) | |
| C08G 77/26 | (2006.01) | |
| C08K 5/5415 | (2006.01) | |
| C08L 23/14 | (2006.01) | |
| C09D 5/02 | (2006.01) | |
| C09D 7/40 | (2018.01) | |
| C09D 7/63 | (2018.01) | |

(52) U.S. Cl.
CPC ............ *C09D 183/04* (2013.01); *B05D 7/02* (2013.01); *C08G 77/08* (2013.01); *C08G 77/12* (2013.01); *C08K 5/5415* (2013.01); *C09D 5/024* (2013.01); *C09D 7/63* (2018.01); *C09D 7/69* (2018.01); *C09D 7/70* (2018.01); *B05D 2201/02* (2013.01); *B05D 2518/10* (2013.01); *C08G 77/26* (2013.01); *C08G 2150/00* (2013.01); *C08L 23/14* (2013.01)

(58) Field of Classification Search
CPC ........ C09D 183/04; C09D 5/024; C09D 7/63; C09D 7/69; C09D 7/70; C09D 7/68; C09D 7/65; C09D 7/20; B05D 7/02; B05D 2201/02; B05D 2518/10; B05D 5/08; B05D 3/0254; B05D 2401/20; B05D 2601/20; C08G 77/08; C08G 77/12; C08G 77/26; C08G 2150/00; C08G 77/18; C08K 5/5415; C08K 5/098; C08K 5/16; C08L 23/14; C08L 23/28; C08J 7/046; C08J 9/365; C08J 2323/16; C08J 2483/04

See application file for complete search history.

(56) References Cited

U.S. PATENT DOCUMENTS

| | | | |
|---|---|---|---|
| 2011/0046304 A1 | 2/2011 | Maliverney | |
| 2015/0073077 A1* | 3/2015 | Horstman | ............. C08G 77/80 524/268 |
| 2016/0152760 A1 | 6/2016 | Cannas et al. | |
| 2023/0407133 A1* | 12/2023 | Kimura | .................... C09D 7/20 |

FOREIGN PATENT DOCUMENTS

| | | |
|---|---|---|
| CN | 1806023 A | 7/2006 |
| CN | 101195726 A | 6/2008 |
| CN | 105283484 A | 1/2016 |
| EP | 0 643 106 B1 | 3/1995 |
| EP | 1 634 934 A1 | 3/2006 |
| JP | H02-233763 A | 9/1990 |
| JP | H08-245882 A | 9/1996 |
| JP | H10-036770 A1 | 2/1998 |
| JP | 2001-207106 A1 | 7/2001 |
| JP | 2002-188057 A | 7/2002 |
| JP | 2004-010751 A | 1/2004 |
| WO | WO-2013/101751 A1 | 7/2013 |

OTHER PUBLICATIONS

Chinese Office Action from CN Appl. No. 202080044493.2 dated Jun. 22, 2022 with English machine translation (13 pages).
Extended European Search Report issued in corresponding European Patent Application No. 20825781.6, dated Jun. 15, 2023 (7 pages).

* cited by examiner

*Primary Examiner* — Anthony J Green
(74) *Attorney, Agent, or Firm* — Foley & Lardner LLP

(57) ABSTRACT

There is provided an aqueous coating agent composition that does not contain an organotin compound and forms a coating film having good slipperiness and having excellent adhesiveness (adhesion) and abrasion resistance. The aqueous coating agent composition contains: (A) polydiorganosiloxane having both terminals blocked with hydroxyl groups, the polydiorganosiloxane having a viscosity of 50 to 100,000,000 mPa·s (at 25° C.); (B) polyorganohydrogensiloxane having at least three hydrogen atoms in one molecule; (C) a zinc compound as a curing catalyst; (D) an organic compound and/or polyorganosiloxane having at least one of a primary amino group and a secondary amino group; (E) an adhesion improving component; and (F) spherical particles.

5 Claims, 1 Drawing Sheet

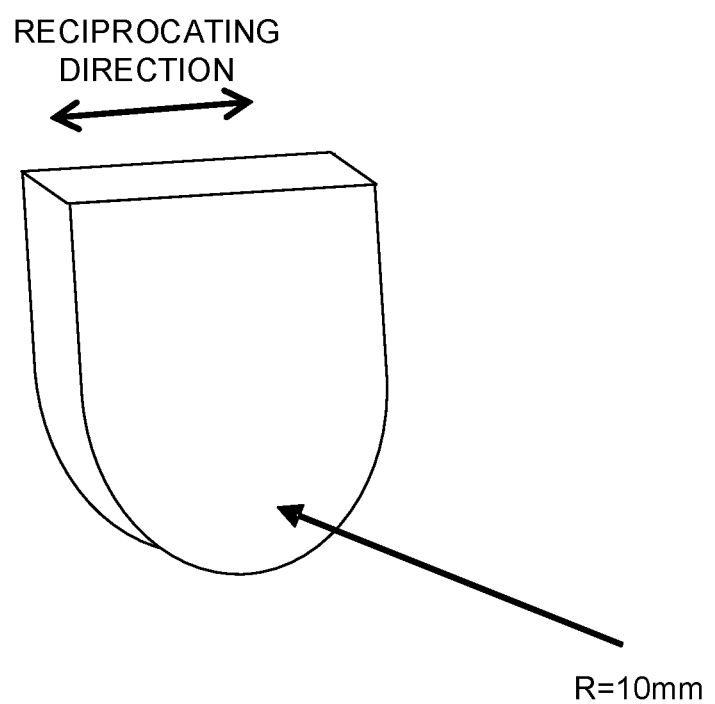

AQUEOUS COATING AGENT COMPOSITION

CROSS-REFERENCE TO RELATED APPLICATION

This application is based upon and claims the benefit of priority from Japanese Patent Application No. 2019-113411, filed on Jun. 19, 2019; the entire contents of which are incorporated herein by reference.

FIELD

Embodiments relate to an aqueous coating agent composition using water as a dispersion medium, and in particular, to an aqueous emulsion-type coating agent composition that does not contain an organotin compound as a curing catalyst and that, when applied to a surface of a base material such as rubber or plastic, forms a coating film that has slipperiness and has excellent adhesiveness (adhesion) and abrasion resistance to the base material.

BACKGROUND

Conventionally, rubber products such as ethylene-propylene-diene ternary copolymer (EPDM) rubber for automotive weather strips have been coated with a coating agent made of a polyorganosiloxane composition in order to give nonadhesiveness, water repellency, abrasion resistance, slipperiness, or the like, to their surfaces.

Known examples of such a coating agent include a composition obtained by adding polyorganosiloxane and/or organoalkoxysilane having a hydrogen atom bonded to a silicon atom and a curing catalyst to polydiorganosiloxane having a hydroxyl group at a terminal, and so on.

However, these compositions contain organic solvents, and thus, they not only have safety and hygiene problems and handling problems due to their large flammability, but also have a large impact on the deterioration of the natural environment. Therefore, in recent years, aqueous emulsion-type coating agents without organic solvents has been developed.

However, when an organic solvent diluted coating agent is applied as an aqueous coating agent which uses water as dispersion medium, it is impossible to sufficiently obtain durability, adhesiveness (adhesion), or the like of a coating film. In addition, this coating agent causes a reaction of a silane component with water to prevent emulsification.

In the meantime, proposed examples of an emulsion-type silicone-based coating agent include a composition comprising various siloxane compounds (see Patent Document 1, for example).

However, this aqueous coating agent has insufficient adhesiveness or abrasion resistance of a coating film. In addition, this aqueous coating agent is insufficient in the preservation stability and working life of an emulsion.

Further, proposed examples of the coating agent include a coating agent obtained by mixing chlorinated polyolefin having a maleic anhydride group with a dealcoholized condensation type silicone-based emulsion in order to improve the adhesiveness and abrasion resistance of a coating film (see Patent Document 2, for example).

However, since being a dealcoholized condensation type coating agent having silicone as a main component, the coating agent described in Patent Document 2 is not obtain satisfactory adhesiveness or abrasion resistance of the coating film.

Further, there has also been proposed a coating agent obtained by mixing specific adhesion improving components (an aminosilane compound, an epoxysilane compound, a carboxylic acid, and so on) with a dehydrogenated condensation type silicone emulsion (see Patent Document 3, for example).

However, this coating agent was also insufficient in terms of uniform coatability, nonadhesiveness, water repellency, slipperiness, adhesiveness to a base material, and so on, thus requiring further improvements.

Further, in order to obtain a coating film sufficiently cured in a short time, an organotin compound such as dibutyltin dilaurate, namely, a compound having a Sn—C bond in which at least one carbon atom is directly bonded to a tin atom, has been mixed as a curing catalyst in these conventional coating agent compositions, but in recent years, restrictions and regulations on the use of such an organotin compound have been tightened depending on the application, field, and country due to its toxicity. This has been promoting discontinuing the organotin compound as a curing catalyst and replacing it with another metal compound.

SUMMARY

This embodiment has been made in order to solve the above-described problems, and an object thereof is to provide an aqueous coating agent composition that has good curability and is capable of forming a coating film having excellent adhesiveness (adhesion) and abrasion resistance to base materials such as rubber and plastics without using an organotin compound as a curing catalyst.

An aqueous coating agent composition in the embodiment contains:

(A) polydiorganosiloxane having both terminals blocked with hydroxyl groups, the polydiorganosiloxane having a viscosity of 50 to 100,000,000 mPa·s at 25° C.;

(B) polyorganohydrogensiloxane having three or more hydrogen atoms bonded to silicon atoms in one molecule;

(C) a zinc compound as a curing catalyst;

(D) an organic compound and/or polyorganosiloxane having at least one of a primary amino group and a secondary amino group;

(E) an adhesion improving component; and (F) spherical particles having an average particle diameter of 0.1 to 100 μm.

In the aqueous coating agent composition in the embodiment, the zinc compound, which is the (C) component, is preferably at least one type selected from zinc octylate and zinc acetate. Further, the (D) component can be aminopropanol. Further, the (D) component can be polyorganosiloxane having a primary amino group.

In the aqueous coating agent composition in the embodiment, the (E) adhesion improving component can be chlorinated polyolefin. In addition, the aqueous coating agent composition in the embodiment can further contain (G) an alkylamine oxide.

Further, the aqueous coating agent composition in the embodiment can be applied on a mold made of foamed or non-foamed EPDM.

The aqueous coating agent composition in the embodiment does not contain an organotin compound-based curing catalyst whose use is being increasingly restricted and regulated due to concerns about its toxicity, and thus it can be used safely and reliably across applications, fields, countries, and so on.

Then, according to the aqueous coating agent composition in the embodiment, it is possible to form a coating film that has extremely good adhesiveness, good slipperiness, non-adhesiveness, water repellency, and so on base materials made of rubber and plastic, in particular, on a base material made of foamed or non-foamed EPDM. In addition, the coating film has a low friction coefficient and excellent abrasion resistance.

Accordingly, the aqueous coating agent composition in the embodiment can be suitably used as a surface treatment agent for rubber parts such as automotive weather strips, printer blades, rubber cushions, and gaskets for construction materials, which are applications where various rubbers such as EPDM are used.

BRIEF DESCRIPTION OF THE DRAWINGS

FIG. 1 is a perspective view illustrating an abrasion member to be used for an abrasion resistance test in an example of the embodiment.

DETAILED DESCRIPTION

There will be explained an embodiment below.

An aqueous coating agent composition in the embodiment contains:
(A) polydiorganosiloxane having both terminals blocked with hydroxyl groups, the polydiorganosiloxane having a viscosity of 50 to 100,000,000 mPa·s at 25° C.;
(B) polyorganohydrogensiloxane having three or more hydrogen atoms bonded to silicon atoms in one molecule;
(C) a zinc compound as a curing catalyst;
(D) an organic compound and/or polyorganosiloxane having a primary amino group and/or a secondary amino group;
(E) an adhesion improving component; and
(F) spherical particles.

Hereinafter, the respective components to be contained in the aqueous coating agent composition in the embodiment will be explained.

<(A) Polydiorganosiloxane Having Both Terminals Blocked with Hydroxyl Groups>

The polydiorganosiloxane, which is the (A) component to be used in the embodiment, is a siloxane compound that has hydroxyl groups bonded to silicon atoms at both terminals of a molecule respectively, and is involved in a curing reaction by its reactivity.

Examples of organic groups bonded to silicon atoms in this polydiorganosiloxane include: alkyl groups such as a methyl group, an ethyl group, a propyl group, a butyl group, and a hexyl group; alkenyl groups such as a vinyl group and a propenyl group; aryl groups such as a phenyl group; aralkyl groups such as a phenethyl group; and organic groups in which some of hydrogen atoms of these hydrocarbon groups are substituted with halogen atoms, cyano groups, nitrile groups, or the like. The methyl group is preferable because of the balance between the ease of synthesis and the physical properties of a cured coating film.

Such terminal hydroxyl group-blocked polydiorganosiloxane has a viscosity of 50 to 100,000,000 mPa·s at 25° C., and preferably has a viscosity of 1,000 to 20,000,000 mPa·s. When the viscosity is less than 50 mPa·s, the cured coating film becomes brittle, and when the viscosity exceeds 100,000,000 mPa·s, on the other hand, it becomes difficult to obtain a stable emulsion.

When the polydiorganosiloxane to be used as the (A) component has a viscosity falling within the above-described range at 25° C., one type may be used alone or two types or more may be used in combination. Besides, the polydiorganosiloxane is preferably linear polysiloxane, but it may have partly a branch structure or a network structure.

In the aqueous coating agent composition in the embodiment, the terminal hydroxyl group-blocked polydiorganosiloxane, which is the (A) component, can be blended as an emulsion with water as a dispersion medium. Then, the polydiorganosiloxane emulsion can be produced by well-known mechanical emulsification or emulsion polymerization in order to obtain a stable emulsion. When blended as an emulsion, the content ratio of the terminal hydroxyl group-blocked polydiorganosiloxane of the (A) component preferably falls within a range of 10 to 70 mass % and more preferably falls within a range of 20 to 50 mass %.

<(B) Polyorganohydrogensiloxane>

The polyorganohydrogensiloxane, which is the (B) component to be used in the embodiment, has at least three hydrogen atoms bonded to silicon atoms in one molecule (Si—H groups), in which the Si—H group undergoes a dehydrogenation condensation reaction with a silanol group (Si—OH) of the (A) component in the presence of the later-described (C) curing catalyst to form a three-dimensional network cured product and form a coating film having a physical strength required for practical use.

In the (B) polyorganohydrogensiloxane, as the organic group bonded to a silicon atom in a molecule, the same one as the organic group bonded to a silicon atom of the (A) component described above is cited as an example. The siloxane chain of the polyorganohydrogensiloxane may be any of linear, branched, and cyclic.

The blending amount of the (B) component is preferably 0.1 to 20 parts by mass and more preferably 1 to 10 parts by mass with respect to 100 parts by mass of the polydiorganosiloxane being the aforementioned (A) component. When the blending amount of the (B) component is less than 0.1 parts by mass, a curing speed is so slow that it is difficult to form a continuous coating film, and when the blending amount exceeds 20 parts by mass, on the other hand, the cured coating film becomes brittle, which is not preferable.

In the aqueous coating agent composition in the embodiment, the polyorganohydrogensiloxane, which is the (B) component, can also be blended as an emulsion with water as a dispersion medium. When blended as an emulsion, the content ratio of the polyorganohydrogensiloxane is preferably 10 to 70 mass % and more preferably in a range of 20 to 50 mass %.

<(C) Zinc Compound being a Curing Catalyst>

The (C) zinc compound to be used in the embodiment is a catalyst that, in combination with the later-described component (D), promotes the dehydrogenation condensation reaction between the silanol group of the aforementioned (A) terminal hydroxyl group-blocked polydiorganosiloxane and the Si—H group of the aforementioned (B) polyorganohydrogensiloxane. Examples of such a zinc compound include a compound that does not have a hydrocarbon group directly bonded to zinc being a metal atom. Specific examples include zinc acetate, zinc sulfate, zinc octylate, zinc laurate, zinc naphthenate, zinc neodecanoate, and so on. From the viewpoint of ease of use and effectiveness, the use of zinc octylate and/or zinc acetate is preferable. These zinc compounds may be used alone or in combination of two or more.

The blending amount of the zinc compound preferably falls within a range of 0.1 to 10 parts by mass and more preferably falls within a range of 0.5 to 5 parts by mass with respect to 100 parts by mass of the aforementioned (A) polydiorganosiloxane. When the blending amount of the zinc compound is less than 0.1 parts by mass, the curing speed is so slow that it is difficult to form a continuous coating film, and when the blending amount exceeds 10 parts by mass, on the other hand, the stability of the composition deteriorates, which is not preferable.

Incidentally, a catalytic action of the aforementioned zinc compound is exhibited only when used in combination with the following (D) component. In the case where only the zinc compound is used and the (D) component is not blended, the function of promoting the dehydrogenation condensation reaction between the silanol group of the (A) component and the Si—H group of the (B) component cannot be fully exhibited.

<(D) Organic Compound and/or Polyorganosiloxane Having at Least One of a Primary Amino Group and a Secondary Amino Group>

The (D) component is a component that exhibits the function as a catalyst for the aforementioned zinc compound in the aqueous coating agent composition in the embodiment. Examples of the (D) component include an organic compound having a primary amino group and/or a secondary amino group and polyorganosiloxane having a primary amino group and/or a secondary amino group. One or more of the organic compound and the polyorganosiloxane each having a primary amino group and/or a secondary amino group are selected to be used.

Incidentally, the primary amino group indicates a monovalent functional group (—$NH_2$) obtained by removing a hydrogen atom from ammonia. Further, the secondary amino group is a monovalent functional group obtained by removing a hydrogen atom from primary amine, and examples thereof include a monoalkylamino group, a monohydroxyamino group (—N(R)H; R is an alkyl group or a hydroxyl group), and an amino group in which a part of hydrogen in the alkyl group of the monoalkylamino group is substituted with a hydroxyl group. Incidentally, as explained above, the primary amino group can also be referred to as an unsubstituted amino group (—$NH_2$), and the secondary amino group can also be referred to as a monosubstituted amino group.

As the (D) organic compound containing a primary amino group and/or a secondary amino group, there can be cited n-butylamine, n-propylamine, n-heptylamine, n-octylamine, n-nonylamine, t-butylamine, isopropylamine, 2-ethylhexylamine, decylamine, dodecylamine, cyclohexylamine, benzylamine, phenethylamine, aminoethanol, aminopropanol, diethanolamine, diisopropanolamine, methylbutylamine, dipropylamine, diisopropylamine, ethylbutylamine, dibutylamine, dioctylamine, dicyclohexylamine, dibenzylamine, ethylenediamine, hexamethylenediamine, diethylenetriamine, and so on. From the viewpoint of water solubility, those having a hydroxyl group are preferable, and the use of aminopropanol and diethanolamine is particularly preferable.

The blending amount of the organic compound containing a primary amino group and/or a secondary amino group preferably falls within a range of 0.01 to 10 parts by mass and more preferably falls within a range of 0.1 to 5 parts by mass with respect to 100 parts by mass of the aforementioned (A) polydiorganosiloxane. When the blending amount of the (D) component is less than 0.01 parts by mass, it is difficult to fully exhibit the catalytic action of the zinc compound, and when the blending amount exceeds 10 parts by mass, on the other hand, the stability of the composition deteriorates, which is not preferable.

Incidentally, among the compounds used as the (E) adhesion improving component to be described later, a silane compound having a primary amino group, such as γ-aminopropyltriethoxysilane, and aminosilicone having a primary amino group are also used as the (D) component because they work to exhibit the catalytic action of the aforementioned zinc compound. In this case, a single compound is considered to contain both the (D) component and the (E) component, and thus, the blending amount of the compound is the total amount of the (D) component and the (E) component.

Further, the polyorganosiloxane (aminosilicone) having a primary amino group and/or a secondary amino group is not particularly limited as long as it is polyorganosiloxane having at least one of a primary amino group and a secondary amino group in a molecule.

There is cited amino group-containing polyorganosiloxane represented by, for example, a general formula: $[R^1_a Si(OR^2)_b O_{(4-a-b)/2}]_n$, (where $R^1$ indicates at least two hydrocarbon groups selected from a hydrogen atom and a monovalent substituted or unsubstituted hydrocarbon group, at least two among all $R^1$ in one molecule are a monovalent hydrocarbon group substituted with a substituted or unsubstituted amino group (a primary amino group or secondary amino group) bonded to a silicon atom via one or more carbon atoms, $R^2$ indicates at least one hydrocarbon group selected from a hydrogen atom and a monovalent substituted or unsubstituted hydrocarbon group, a and b are numerals satisfying the relations of $1 \leq a \leq 2.5$, $1 \leq a+b \leq 2.5$, and $0 \leq b \leq 0.5$, and n indicates a numeral of 4 to 5,000).

This amino group-containing polyorganosiloxane can be blended as an emulsion with water as a dispersion medium. When blended as an emulsion, the content ratio of this amino group-containing polyorganosiloxane preferably falls within a range of 10 to 70 mass %.

In this amino group-containing polyorganosiloxane, examples of the primary amino group or the secondary amino group bonded to a silicon atom via at least one carbon atom include an aminomethyl group, a β-aminoethyl group, a γ-aminopropyl group, a δ-aminobutyl group, a γ-(methylamino)propyl group, a γ-(ethylamino)propyl group, an N-(β-aminoethyl)-γ-aminopropyl group, an N-(β-dimethylaminoethyl)-γ-aminopropyl group, and so on. Examples of $R^1$ other than these amino group-containing hydrocarbon groups include: alkyl groups such as a hydrogen atom, a methyl group, an ethyl group, a propyl group, a butyl group, and a hexyl group; alkenyl groups such as a vinyl group and a propenyl group; an aryl group such as a phenyl group; an aralkyl group such as a phenethyl group; and those in which some of hydrogen atoms of these hydrocarbon groups are substituted with halogen atoms, nitrile groups, or the like. From the viewpoint of ease of synthesis and handling, among these, the hydrogen atom, the methyl group, the vinyl group, and the phenyl group are preferable, and the methyl group is particularly preferable.

Examples of $R^2$ include a hydrogen atom, a methyl group, an ethyl group, a propyl group, a butyl group, and so on. From the viewpoint of ease of synthesis and handling, among theses, the hydrogen atom, the methyl group, and the ethyl group are preferable.

In the aforementioned general formula (average compositional formula) representing the amino group-containing polyorganosiloxane, a and b are numerals satisfying the aforementioned relations, and the case where a and (a+b) are less than 1 or greater than 2.5 is not preferable. b indicates the number of hydroxyl groups or alkoxy groups bonded to a silicon atom and only needs to be 0.5 or less. When it exceeds 0.5, the preservation stability of the aqueous coating agent deteriorates.

Further, such amino group-containing polyorganosiloxane has a polymerization degree n falling within a range of 4 to 5,000 and preferably falling within a range of 4 to 1,000, from the viewpoint of the ease of synthesis, the viscosity of the composition before curing falling within a range not hindering the work, and the adhesion of the cured coating film. When the polymerization degree is smaller than 4, the adhesiveness is not improved sufficiently, and when the polymerization degree is larger than 5,000, on the other hand, synthesizing is difficult and further, the viscosity increases, making handling difficult. The content of such polyorganosiloxane (aminosilicone) having a primary amino group and/or a secondary amino group is preferably set to 1 to 100 parts by mass and more preferably 10 to 50 parts by mass in total with respect to 100 parts by mass of the aforementioned (A) polydiorganosiloxane.

<(E) Adhesion Improving Component>

The (E) component gives the coating film obtained from the aqueous coating agent composition in the embodiment excellent adhesion (adhesiveness) to a rubber base material or the like, and improves the abrasion resistance of the coating film.

Examples of the (E) component include chlorinated polyolefin and acryl-modified polyolefin, and the (E) component preferably contains at least one of chlorinated polyolefin and acryl-modified polyolefin. The use of chlorinated polyolefin is particularly preferable because the chlorinated polyolefin has excellent stability after blending and allows a sufficient working life. The chlorinated polyolefin and the acryl-modified polyolefin are preferably blended in an emulsion form.

Although there are no particular restrictions on the chlorine content or the molecular weight of base polyolefin in the chlorinated polyolefin emulsion, it is preferable to use modified chlorinated polypropylene having a maleic anhydride group as a reaction group, namely an emulsion of maleic anhydride-modified chlorinated polypropylene for ease of availability. It is particularly preferable to use one obtained by emulsifying the maleic anhydride-modified chlorinated polyolefin having a molecular weight of 10,000 to 200,000, a chlorine content of 5 to 35 mass %, and a maleic anhydride group content of 0.1 to 30 mass %.

Further, although there are no particular restrictions on the acrylic modification rate (content of acrylic acid) or the molecular weight of base polyolefine also in the acryl-modified polyolefin emulsion, it is preferable to use acryl-modified polyolefin having a maleic anhydride group as a reaction group, namely an emulsion of maleic anhydride-acryl-modified polyolefin for ease of availability. It is particularly preferable to use one obtained by emulsifying the maleic anhydride-acryl-modified polyolefin having a molecular weight of 10,000 to 200,000, an acrylic acid content of 5 to 35 mass %, and a maleic anhydride group content of 0.1 to 30 mass %.

When the chlorinated polyolefin and/or the acryl-modified polyolefin is blended as the (E) adhesion improving component, the total content of these is set to 5 to 150 parts by mass and preferably set to 50 to 100 parts by mass with respect to 100 parts by mass of the aforementioned (A) polydiorganosiloxane. The reason why the total content is limited to the above-described range is because when the content is less than 5 parts by mass, the improvements in the adhesion and the abrasion resistance to the rubber base material, which are the purpose of blending, cannot be sufficiently achieved, and even if the content exceeds 150 parts by mass, on the other hand, the effect of improving the adhesion and the abrasion resistance to the rubber base material will be saturated, resulting in the deterioration of other properties such as weather resistance.

In the embodiment, as the (E) adhesion improving component, aminosilicone or a silane compound having an amino group or an epoxy group can also be used.

As the aminosilicone, for example, polyorganosiloxane represented by an average formula: $(CH_3)_3SiO[\{H_2N(CH_2)_2NH(CH_2)_3\}CH_3SiO]_{100}(CH_3)_3$ can be cited.

The silane compound having an amino group is alkoxysilane having a substituted or unsubstituted amino group bonded to a silicon atom via at least one carbon atom, and examples of the substituted or unsubstituted amino group include an aminomethyl group, a β-aminoethyl group, a γ-aminopropyl group, a δ-aminobutyl group, a γ-(methylamino)propyl group, a γ-(ethylamino)propyl group, an N-(β-aminoethyl)-γ-aminopropyl group, an N-(β-dimethylaminoethyl)-γ-aminopropyl group, and so on. Further, for an increase in the adhesion to the base material, the alkoxysilane has an alkoxy group bonded to a silicon atom. Examples of the alkoxy group include a methoxy group, an ethoxy group, a propoxy group, a butoxy group, and so on, but for ease of synthesis, the methoxy group and the ethoxy group are commonly used. At least two such alkoxy groups are preferably present in one molecule in order to obtain good adhesion. The other remaining groups bonded to the silicon atom are monovalent alkyl groups having 1 to 6 carbon atoms.

The silane compound having an epoxy group is alkoxysilane having a monovalent hydrocarbon group substituted with an epoxy group-containing group bonded to a silicon atom and an alkoxy group bonded to the silicon atom. Examples of the epoxy group-containing group include a glycidoxy group, an epoxy cyclohexyl group, and so on. Examples of the alkoxy group include a methoxy group, an ethoxy group, a propoxy group, a butoxy group, and so on, but for ease of synthesis, the methoxy group and the ethoxy group are commonly used. At least two such alkoxy groups are preferably present in one molecule in order to obtain good adhesion. The other remaining groups bonded to the silicon atom are monovalent alkyl groups having 1 to 6 carbon atoms.

Incidentally, as the (E) adhesion improving component, a partial hydrolysate of the silane compound having an amino group or an epoxy group can also be used.

The total content of the aminosilicone and the silane compound having an amino group or an epoxy group is preferably set to 1 to 100 parts by mass and more preferably 10 to 50 parts by mass with respect to 100 parts by mass of the aforementioned (A) polydiorganosiloxane.

Incidentally, when the aforementioned aminosilicone or the silane compound having a primary amino group such as the γ-aminopropyltriethoxysilane is used as the (E) adhesion improving component, the silicone or compound also functions as the (D) component that exhibits the function as a catalyst for the zinc compound.

<(F) Spherical Particle>

The spherical particles, which are the (F) component, lower the friction coefficient of the coating film obtained from the aqueous coating agent composition in the embodiment, provide good slipperiness and also provide excellent abrasion resistance. Further, it is possible to prevent squeak from being generated when a coated mold is rubbed against the surface of wet glass.

The material forming the spherical particles is not particularly limited, but a rubber-like elastic material or a hard resin is preferable, and their types and hardness are not particularly limited.

As the spherical particles being the (F) component, spherical particles made of a polymer of cross-linked urethane base, cross-linked polymethyl methacrylate base, cross-linked polyacrylic ester base, cross-linked polybutyl methacrylate base, silicone base, or the like are preferably used for ease of availability and synthesis. Further, an average particle diameter of these spherical particles is preferably 0.1 to 100 μm and more preferably 1 to 30 μm. When the average particle diameter is less than 0.1 μm, the slipperiness of the coating film deteriorates, and when the average particle diameter exceeds 100 μm, on the other hand, the abrasion resistance deteriorates, which is not preferable.

The blending amount of the spherical particles being the (F) component is set to 10 to 150 parts by mass and more preferably set to 20 to 80 parts by mass with respect to 100 parts by mass of the aforementioned (A) polydiorganosiloxane. The reason why the blending amount of the (F) component is limited to the above-described range is because when the blending amount is less than 10 parts by mass, the slipperiness of the coating film deteriorates, and when the blending amount exceeds 150 parts by mass, on the other hand, a coating property deteriorates and particles are aggregated to create a rough texture on the coating film, which is not preferable.

<(G) Alkylamine Oxide and Other Components>

In the aqueous coating agent composition in the embodiment, a surface active agent can be added to help dispersibility of the aforementioned spherical particles in an aqueous system. Examples of the usable surface active agent include an alkylamine oxide. The alkylamine oxide can be mixed with the spherical particles beforehand in the form of emulsion or aqueous solution (10 to 50 mass % at a solid content ratio) to be added. Examples of the alkylamine oxide include a dimethylalkylamine oxide. Examples of the alkyl group include a lauryl group, a myristyl group, a natural oil and fat denatured group such as coconut oil, and so on.

Further, in the embodiment, when zinc octylate is used as the aforementioned (C) curing catalyst, the zinc octylate can be added to the emulsion as it is, or the zinc octylate mixed with a surface active agent beforehand can be added. Examples of the surface active agent to be used at this time include nonionic surface active agents such as polyoxyethylenelaurylether and polyoxyethylene fatty acid ester. As commercial products of the polyoxyethylenelaurylether, EMULGEN 104P and EMULGEN 106 (both trade names of Kao Corporation) are cited.

The amount of these surface active agents used is preferably a ratio of 5 to 50 mass % with respect to the zinc octylate.

Further, the aqueous coating agent composition in the embodiment can be blended with a carbon black dispersion for coloring and improving the weather resistance of the coating film.

To prepare the aqueous coating agent composition in the embodiment, there can be employed a method of obtaining an emulsion by blending the emulsion of the (A) component, the emulsion of the (B) component, the (C) component, and the (D) component and the (E) component that are emulsified as necessary in order and further blending the (G) alkylamine oxide aqueous solution and the carbon dispersion as necessary and mixing and dispersing the spherical particles being the (F) component in the obtained emulsion.

Further, some types of the spherical particles have poor dispersibility in water, and thus, the spherical particles are preferably added after being mixed with the surface active agent such as the alkylamine oxide beforehand as described above. Further, depending on the coating method, performing dilution with further addition of water is preferable.

Further, in order to produce the emulsion containing the (A) component, the (B) component, the (D) component, and the (E) component, the respective components may be emulsified independently each using an appropriate emulsifier to then be mixed, or two or three of the components may be mixed to then be emulsified. Further, as the emulsion, one produced by existing mechanical emulsification or emulsion polymerization can be used as appropriate.

Further, in the case where the organic compound having a primary amino group and/or a secondary amino group such as aminopropanol is used as the (D) component, this organic compound and the zinc compound being the (C) curing catalyst may be added to the emulsion separately, or the zinc compound being the (C) curing catalyst and the aforementioned organic compound (aminopropanol) may be mixed beforehand, and this mixture may be added.

Further, in the embodiment, an inorganic or organic ultraviolet absorbent can be added to improve the weather resistance, and an inorganic pigment or the like can be added for coloring, each within a range not changing the gist of the embodiment. Further, a thickener, a deforming agent, and an antiseptic agent can also be blended appropriately as necessary.

Applying the aqueous coating agent composition in the embodiment is performed on a surface of a base material made of paper, rubber, plastic, metal, or the like by a method such as dip coating, spray coating, brush application, knife coating, or roll coating. Then, the coating is left at room temperature for several days, or the coating is appropriately heated in accordance with the degree of heat resistance of the base material to cure the coating film. Heating conditions are preferably set as follows: heating for 30 seconds to 5 minutes at a temperature of 120 to 180° C. in the case of the base material being a paper; heating for 1 to 10 minutes at a temperature of 80 to 180° C. in the case of the base material being a rubber; and heating for 30 seconds to 5 minutes at a temperature of 70 to 150° C. in the case of the base material being a plastic.

The aqueous coating agent composition in the embodiment does not contain an organotin compound-based curing catalyst whose use is being increasingly restricted and regulated due to concerns about its toxicity, and thus it can be used safely and reliably across applications, fields, countries, and so on. Then, when surfaces of various base materials are treated with this coating agent composition, cured coating films each having excellent uniform coatability and having excellent adhesiveness and abrasion resistance to the base material can be obtained. Then, it is possible to form a coating film having excellent adhesiveness and abrasion resistance on rubber and plastic materials, particularly on a base material made of foamed or non-foamed EPDM rubber, where a coating film having sufficient adhesiveness was not able to be obtained from a conventional silicone composition for forming a nonadhesive coating film.

Further, according to the aqueous coating agent composition in the embodiment, a cured coating film is formed at room temperature or at a relatively low temperature, so that treatments can be performed even on base materials with low heat resistance or large base materials that are difficult to be heat treated, and a cured coating film having good nonadhesiveness to other substances and having water repellency and excellent abrasion resistance is formed. Further, the emulsions of the respective components each have excellent preservation stability, the stability after blending the emulsions of the respective components is excellent, and the working life is long.

Accordingly, the aqueous coating agent composition in the embodiment can be used suitably as a surface treatment agent for rubber parts such as automotive weather strips, printer blades, rubber cushions, and gaskets for construction materials, which are applications where EPDM rubber and so on are used. Besides, the aqueous coating agent composition in the embodiment is used when giving nonadhesiveness and water repellency to various types of base materials such as rubber and plastic.

EXAMPLES

Hereinafter, the embodiment will be explained specifically by citing examples, but the embodiment is not limited to the following examples. Incidentally, all the physical property values of a viscosity and so on indicate values at 25° C. and a relative humidity of 50%, and % represents mass % in the examples. Further, in tables, part represents part by mass.

Examples 1 to 15, Comparative Examples 1 to 7

Components illustrated in Table 1 to Table 3 were blended with compositions illustrated in the same tables to prepare aqueous coating agent compositions. Incidentally, in Example 1 and Example 6, zinc octylate was not added as it was, but a mixture of zinc octylate and a surface active agent was added. In addition, unless otherwise stated, emulsions with water as a dispersion medium were used.

Details of the respective components in the tables are as follows.

<(A) Component>
Polydimethylsiloxane Emulsion-1
An emulsion polymerized emulsion containing terminal hydroxyl group-blocked polydimethylsiloxane having a viscosity of 1,400,000 mPa·s at a ratio of 50%
Polydimethylsiloxane Emulsion-2
A mechanical emulsified emulsion containing terminal hydroxyl group-blocked polydimethylsiloxane having a viscosity of 10,000,000 mPa·s at a ratio of 50%

<(B) Component>
Methylhydrogensiloxane Emulsion
A mechanical emulsified emulsion containing polymethylhydrogensiloxane represented by an average formula: $(CH_3)_3SiO(CH_3HSiO)_{50}Si(CH_3)_3$ at a ratio of 30%

<(C) Component>
Zinc octylate-1 (manufactured by NIHON KAGAKU SANGYO CO., LTD., product name: Nikka Octix Zinc 8%)
Zinc octylate-2 (manufactured by King Industries, Inc., product name: K-KAT XK-661)
Zinc acetate: a solution of zinc acetate (manufactured by YONEYAMA KAGAKU KOGYO KAISHA, LTD.) diluted with water to 20% solid content <(D) Component>
Aminopropanol (manufactured by Tokyo Chemical Industry Co., Ltd., product name: 3-Amino-1-propanol)
Diethanolamine (manufactured by Tokyo Chemical Industry Co., Ltd., product name: Diethanolamine)
Triethylamine (manufactured by Tokyo Chemical Industry Co., Ltd., product name: Triethylamine)
Amino group-containing polysiloxane emulsion-1
An emulsion polymerized emulsion containing amino group-containing polysiloxane represented by an average formula: $\{H_2N(CH_2)_2NH(CH_2)_3\}SiO[\{(CH_3)_2SiO\}_{15}OH]_3$ at a ratio of 30%
Amino Group-Containing Polysiloxane Emulsion-2
A mechanical emulsified emulsion containing amino group-containing polysiloxane represented by an average formula:
$(CH_3)_3SiO\{(CH_3)_2SiO\}_{400}[\{H_2N(CH_2)_2NH(CH_2)_3\}CH_3SiO]_4Si(CH_3)_3$ at a ratio of 40%

<(E) Component>
Chlorinated Polyolefin Emulsion
An emulsion containing 30% of maleic anhydride-modified chlorinated polypropylene having a chlorine content of 15% and a molecular weight of about 100,000
Polyolefin Emulsion
An emulsion containing 30% of maleic anhydride-acryl-modified polyolefin (ethylene-propylene copolymer of 97.5 mol % of propylene-2.5 mol % of ethylene) having a maleic anhydride content of 1.6%, an acrylic acid content of 3%, and a molecular weight of about 68,000
Water-Soluble Aminosilicone
Polyorganosiloxane represented by an average formula:

$$(CH_3)_3SiO[\{H_2N(CH_2)_2NH(CH_2)_3\}CH_3SiO]_{100}Si(CH_3)_3$$

γ-aminopropyltriethoxysilane (manufactured by Momentive Performance Material Japan LLC, product name: Silquest A-1100* Silane)
Glycidoxypropyltrimethoxysilane (manufactured by Momentive Performance Material Japan LLC, product name: Silquest A-187* Silane)

<(F) Component>
Spherical Particles-1
A cross-linked urethane soft powder (an average particle diameter of 6 μm) having a hardness of 74 that is measured with a durometer type A according to JIS K 6253 (to be hereinafter referred to as JIS A hardness simply)
Spherical Particles-2
A polymethylsilsesquioxane powder (an average particle diameter of 6 μm)
Spherical Particles-3
A cross-linked polyacrylic ester powder having a JIS A hardness of 78 (an average particle diameter of 15 μm)
Spherical Particles-4
A dimethyl silicone cross-linked elastic material powder having a JIS A hardness of 75 (an average particle diameter of 5 μm)

<(G) Component>
A 30% dimethyllaurylamine oxide aqueous solution (manufactured by Kao Corporation, product name: AMPHITOL 20N)

<Others>
Surface Active Agent
Polyoxyethylenelaurylether (manufactured by Kao Corporation, product name: EMULGEN 104P)
Acetic acid (manufactured by Showa Denko K.K., product name: acetic acid)
Carbon black dispersion
Micropigmo WMBK-5 (product name of ORIENT CHEMICAL INDUSTRIES CO., LTD.)

Then, the blending stability and curability of the obtained coating agent compositions were examined as follows.

[Blending Stability]

The presence or absence of thickening and gelation of the coating agent composition immediately after blending was examined. The absence of the thickening or gelation was indicated by a circle mark ○, and the presence of the thickening and gelation was indicated by a cross mark x.

[Curability]

One gram of the coating agent composition was placed in an aluminum petri dish and heated and dried at 150° C. for 30 minutes, and then whether or not a coating film was formed was examined. The presence of forming the coating film was indicated by a circle marks ○, and the absence of forming the coating film was indicated by a cross mark x.

Further, the obtained coating agent composition was applied to the surface of a foamed EPDM rubber sheet using a spray gun. Thereafter, after water was volatilized from the coating film, the sheet was heated and dried in an oven at 150° C. for 10 minutes to obtain a cured coating film having a thickness of 10 μm.

Then, the adhesiveness, the abrasion resistance, and the friction coefficient of the cured coating film on the foamed EPDM rubber sheet that was surface treated as above were examined by the following methods, respectively. In addition, the working life of the coating agent composition was examined.

[Adhesiveness]

Eleven parallel lines were marked in a matrix at intervals of 1 mm on the surface of the coating film to cross-cut 100 grids, and an adhesive tape was attached on the grids. Thereafter, the adhesive tape was peeled off to measure the number of grids that were not peeled off. Incidentally, as the adhesive tape, there was used one obtained by coating a polyester tape with a silicone adhesive YR3340 (manufactured by Momentive) to a thickness of 40 μm and then leaving the tape in a constant temperature and humidity chamber for 48 hours.

[Abrasion Resistance]

A glass plate illustrated in FIG. 1 that has a thickness of 2 mm and a width of 20 mm and has a curved contact surface was used as an abrasion member, and an abrasion test was performed in which the abrasion member was pressed against the surface of the coating film under a load of 400 g and made to reciprocate for a distance of 15 cm at a speed of 60 times/min. The abrasion resistance was evaluated according to the number of reciprocations when the surface of the foamed EPDM rubber sheet was worn out by abrasion.

[Friction Coefficient]

A glass plate having a width of 10 mm and a length of 100 mm was placed on the surface of the coating film, and the glass plate was moved at a speed of 900 mm/min. under a 200-g-load application. Then, a dynamic friction coefficient was found from an obtained tensile stress. Incidentally, a maximum static friction coefficient is a value at the time when the glass plate is started to move.

[Working Life]

After preparation of the coating agent composition, the time required for gel to form in the solution at room temperature (25° C.) was examined.

Results are illustrated in Table 1 to Table 3.

Incidentally, in the lower columns of Table 3, where the properties of comparative examples are illustrated, "-" indicates that the properties such as adhesiveness, abrasion resistance, friction coefficient, and working life cannot be evaluated because no cured coating film is obtained.

TABLE 1

|  |  |  | Example | | | | | | | |
|---|---|---|---|---|---|---|---|---|---|---|
|  |  |  | 1 | 2 | 3 | 4 | 5 | 6 | 7 | 8 |
| Composition (parts by mass) | (A) | Polydimethylsiloxane emulsion-1 | 30 | 30 | 30 | 30 | 30 | 30 | 30 | — |
|  |  | Polydimethylsiloxane emulsion-2 | — | — | — | — | — | — | — | 30 |
|  | (B) | Methylhydrogensiloxane emulsion | 4 | 4 | 4 | 4 | 4 | 4 | 4 | 4 |
|  | (C) | Zinc octylate-1 | 0.6 | — | — | — | — | 0.6 | — | — |
|  |  | Zinc octylate-2 | — | — | — | — | — | — | — | — |
|  |  | Zinc acetate | — | 5 | 5 | 5 | 5 | — | 5 | 5 |
|  | (D) | Aminopropanol | 0.2 | 0.2 | 0.2 | 0.2 | — | 0.2 | — | — |
|  |  | Diethanolamine | — | — | — | — | 0.2 | — | — | — |
|  |  | Triethylamine | — | — | — | — | — | — | — | — |
|  |  | Amino group-containing polysiloxane emulsion-1 | — | — | — | — | — | 15 | 15 | 15 |
|  |  | Amino group-containing polysiloxane emulsion-2 | — | — | — | — | — | — | — | — |
|  | (E) | Chlorinated polyolefin emulsion | 20 | 20 | 20 | 20 | 20 | 20 | 20 | 20 |
|  |  | Polyolefin emulsion | — | — | — | — | — | — | — | — |
|  |  | Water-soluble aminosilicone | — | — | — | — | — | — | — | — |
|  |  | γ-aminopropyltriethoxysilane | — | — | — | — | — | — | — | — |
|  |  | Glycidoxypropyl-trimethoxysilane | — | — | — | — | — | — | — | — |
|  | (F) | Spherical particles-1 | 5 | 5 | 5 | 5 | 5 | 5 | 5 | 5 |
|  |  | Spherical particles-2 | — | — | — | — | — | — | — | — |
|  |  | Spherical particles-3 | — | — | — | — | — | — | — | — |
|  |  | Spherical particles-4 | — | — | — | — | — | — | — | — |
|  | (G) | 30% dimethyllaurylamine oxide aqueous solution | 2 | 2 | — | 2 | 2 | 2 | 2 | 2 |
|  | Others | Surface active agent | 0.4 | — | — | — | — | 0.4 | — | — |
|  |  | Acetic acid | — | — | — | — | — | — | — | — |
|  |  | Carbon black dispersion | 1 | 1 | 1 | — | 1 | 1 | 1 | 1 |
|  |  | Water | 36.8 | 32.8 | 34.8 | 33.8 | 32.8 | 21.8 | 18 | 18 |

TABLE 1-continued

|  |  | Example | | | | | | | |
|---|---|---|---|---|---|---|---|---|---|
|  |  | 1 | 2 | 3 | 4 | 5 | 6 | 7 | 8 |
| Physical properties | Blending stability | ○ | ○ | ○ | ○ | ○ | ○ | ○ | ○ |
|  | Curability | ○ | ○ | ○ | ○ | ○ | ○ | ○ | ○ |
|  | Adhesiveness | 100/100 | 100/100 | 100/100 | 100/100 | 100/100 | 100/100 | 100/100 | 100/100 |
|  | Abrasion resistance-number of abrasions | 300 | 300 | 300 | 300 | 300 | >1000 | >1000 | >1000 |
|  | Friction coefficient μK | 0.14 | 0.18 | 0.17 | 0.13 | 0.12 | 0.13 | 0.11 | 0.13 |
|  | Working life-time | 8 hr or more | 8 hr or more | 8 hr or more | 8 hr or more | 8 hror more | 8 hror more | 8 hr or more | 8 hr or more |

TABLE 2

|  |  |  | Example | | | | | | | |
|---|---|---|---|---|---|---|---|---|---|---|
|  |  |  | 9 | 10 | 11 | 12 | 13 | 14 | 15 | 16 |
| Composition (part) | (A) | Polydimethylsiloxane emulsion-1 | — | 30 | 30 | 30 | 30 | 30 | 30 | — |
|  |  | Polydimethylsiloxane emulsion-2 | 30 | — | — | — | — | — | — | 30 |
|  | (B) | Methylhydrogensiloxane emulsion | 4 | 4 | 4 | 4 | 4 | 4 | 4 | 4 |
|  | (C) | Zinc octylate-1 | — | — | — | — | — | — | — | — |
|  |  | Zinc octylate-2 | — | — | — | — | — | — | — | — |
|  |  | Zinc acetate | 5 | 5 | 5 | 5 | 5 | 5 | 5 | 5 |
|  | (D) | Aminopropanol | — | — | — | — | — | — | — | — |
|  |  | Diethanolamine | — | — | — | — | — | — | — | — |
|  |  | Triethylamine | — | — | — | — | — | — | — | — |
|  |  | Amino group-containing polysiloxane emulsion-1 | 15 | — | 15 | 15 | 15 | 15 | 15 | 15 |
|  |  | Amino group-containing polysiloxane emulsion-2 | — | 15 | — | — | — | — | — | — |
|  | (E) | Chlorinated polyolefin emulsion | 20 | 20 | — | — | 20 | 20 | 20 | — |
|  |  | Polyolefin emulsion | — | — | 20 | — | — | — | — | — |
|  |  | Water-soluble aminosilicone | — | — | — | 1.5 | — | — | — | 1.5 |
|  |  | γ-aminopropyltriethoxysilane | — | — | — | 1.5 | — | — | — | 1.5 |
|  |  | Glycidoxypropyl-trimethoxysilane | — | — | — | 1.5 | — | — | — | 1.5 |
|  | (F) | Spherical particles-1 | 5 | 5 | 5 | 5 | — | — | — | — |
|  |  | Spherical particles-2 | — | — | — | — | 5 | — | — | 5 |
|  |  | Spherical particles-3 | — | — | — | — | — | 5 | — | — |
|  |  | Spherical particles-4 | — | — | — | — | — | — | 10 | — |
|  | (G) | 30% dimethyllaurylamine oxide aqueous solution | 2 | 2 | 2 | 2 | 2 | 2 | 2 | 2 |
|  | Others | Surface active agent | — | — | — | — | — | — | — | — |
|  |  | Acetic acid | — | — | — | 1.5 | — | — | — | 1.5 |
|  |  | Carbon black dispersion | 1 | 1 | 1 | 1 | 1 | 1 | 1 | 1 |
|  |  | Water | 18 | 18 | 18 | 32 | 18 | 18 | 13 | 32 |
| Physical properties | Blending stability | | ○ | ○ | ○ | ○ | ○ | ○ | ○ | ○ |
|  | Curability | | ○ | ○ | ○ | ○ | ○ | ○ | ○ | ○ |
|  | Adhesiveness | | 100/100 | 100/100 | 100/100 | 100/100 | 100/100 | 100/100 | 100/100 | 100/100 |
|  | Abrasion resistance-number of abrasions | | >1000 | >1000 | >1000 | >1000 | >1000 | >1000 | >1000 | >1000 |
|  | Friction coefficient μK | | 0.13 | 0.21 | 0.12 | 0.11 | 0.09 | 0.14 | 0.26 | 0.10 |
|  | Working life-time | | 8 hr or more | 8 hr or more | 8 hr or more | 8 hr or more | 8 hror more | 8 hr or more | 8 hr or more | 8 hr or more |

TABLE 3

|  |  |  | Comparative example | | | | | | | |
|---|---|---|---|---|---|---|---|---|---|---|
|  |  |  | 1 | 2 | 3 | 4 | 5 | 6 | 7 | 8 |
| Composition (part) | (A) | Polydimethylsiloxane emulsion-1 | 30 | 30 | 30 | 30 | 30 | 30 | 30 | 30 |
|  |  | Polydimethylsiloxane emulsion-2 | — | — | — | — | — | — | — | — |
|  | (B) | Methylhydrogensiloxane emulsion | 4 | 4 | 4 | 4 | 4 | 4 | 4 | — |

TABLE 3-continued

|  |  | Comparative example | | | | | | | |
|---|---|---|---|---|---|---|---|---|---|
|  |  | 1 | 2 | 3 | 4 | 5 | 6 | 7 | 8 |
| (C) | Zinc octylate-1 | — | 1 | 0.6 | — | — | — | — | — |
|  | Zinc octylate-2 | — | — | — | 0.6 | — | — | — | — |
|  | Zinc acetate | — | — | — | — | 5 | 5 | 5 | 5 |
| (D) | Aminopropanol | — | — | — | — | — | — | — | — |
|  | Diethanolamine | — | — | — | — | — | 0.2 | — | — |
|  | Triethylamine | — | — | — | — | — | — | 0.2 | — |
|  | Amino group-containing polysiloxane emulsion-1 | — | — | — | — | — | — | — | 15 |
|  | Amino group-containing polysiloxane emulsion-2 | — | — | — | — | — | — | — | — |
| (E) | Chlorinated polyolefin emulsion | 20 | 20 | 20 | 20 | 20 | — | 20 | 20 |
|  | Polyolefin emulsion | — | — | — | — | — | — | — | — |
|  | Water-soluble aminosilicone | — | — | — | — | — | — | — | — |
|  | γ-aminopropyltriethoxysilane | — | — | — | — | — | — | — | — |
|  | Glycidoxypropyl-trimethoxysilane | — | — | — | — | — | — | — | — |
| (F) | Spherical particles-1 | 5 | 5 | 5 | 5 | 5 | 5 | 5 | 5 |
|  | Spherical particles-2 | — | — | — | — | — | — | — | — |
|  | Spherical particles-3 | — | — | — | — | — | — | — | — |
|  | Spherical particles-4 | — | — | — | — | — | — | — | — |
| (G) | 30% dimethyllaurylamine oxide aqueous solution | 2 | 2 | 2 | 2 | 2 | 2 | 2 | 2 |
| Others | Surface active agent | — | — | 0.4 | 0.4 | — | — | — | — |
|  | Acetic acid | — | — | — | — | — | — | — | — |
|  | Carbon black dispersion | 1 | 1 | 1 | 1 | 1 | 1 | 1 | 1 |
|  | Water | 38 | 37 | 37 | 37 | 33 | 52.8 | 32.8 | 22 |
| Physical properties | Blending stability | ○ | x Incompatibility | ○ | ○ | ○ | ○ | ○ | ○ |
|  | Curability | x | — | x | x | x | ○ | x | x |
|  | Adhesiveness | — | — | — | — | — | 0/100 | — | — |
|  | Abrasion resistance-number of abrasions | — | — | — | — | — | — | — | — |
|  | Friction coefficient μK | — | — | — | — | — | — | — | — |
|  | Working life-time | — | — | — | — | — | 8 hr or more | — | — |

The aqueous coating agent composition in the embodiment does not contain an organotin compound-based curing catalyst, and thus it can be used safely and reliably across applications, fields, countries, and so on. Then, according to the aqueous coating agent composition in the embodiment, it is possible to form a coating film that has extremely good adhesiveness, good slipperiness, nonadhesiveness, water repellency, and so on base materials made of rubber and plastic, in particular, on a base material made of foamed or non-foamed EPDM. In addition, the coating film has a low friction coefficient and excellent abrasion resistance.

Accordingly, the aqueous coating agent composition in the embodiment is suitably used as a surface treatment agent for rubber parts such as automotive weather strips, printer blades, rubber cushions, and gaskets for construction materials.

What is claimed is:

1. An aqueous coating agent composition, comprising:
    (A) polydiorganosiloxane having both terminals blocked with hydroxyl groups, the polydiorganosiloxane having a viscosity of 50 to 100,000,000 mPa·s at 25° C.;
    (B) polyorganohydrogensiloxane having three or more hydrogen atoms bonded to silicon atoms in one molecule;
    (C) a zinc compound of a curing catalyst;
    (D) aminopropanol;
    (E) an adhesion improving component; and
    (F) spherical particles having an average particle diameter of 0.1 to 100 μm.

2. The composition according to claim 1, wherein the zinc compound of the (C) component is at least one selected from the group consisting of zinc octylate and zinc acetate.

3. The composition according to claim 1, wherein:
    the (E) adhesion improving component is chlorinated polyolefin.

4. The composition according to claim 1, further comprising:
    (G) an alkylamine oxide.

5. The composition according to claim 1, wherein:
    the composition is applied on a mold of a foamed or non-foamed ethylene-propylene-diene ternary copolymer.

* * * * *